US011399549B2

(12) United States Patent
Schliesser et al.

(10) Patent No.: US 11,399,549 B2
(45) Date of Patent: Aug. 2, 2022

(54) APPARATUS AND METHOD FOR PRODUCING COEXTRUDED PRODUCTS WITH A VARIABLE THICKNESS OF THE CASING MATERIAL

(71) Applicant: Albert Handtmann Maschinenfabrik GmbH & Co. KG, Biberach (DE)

(72) Inventors: Markus Schliesser, Wain (DE); Manfred Baechtle, Schemmerhofen (DE)

(73) Assignee: Albert Handtmann Maschinenfabrik GmbH & Co. KG, Biberach (DE)

(*) Notice: Subject to any disclaimer, the term of this patent is extended or adjusted under 35 U.S.C. 154(b) by 0 days.

(21) Appl. No.: 17/171,868

(22) Filed: Feb. 9, 2021

(65) Prior Publication Data

US 2021/0259261 A1 Aug. 26, 2021

(30) Foreign Application Priority Data

Feb. 20, 2020 (EP) .................................... 20158401

(51) Int. Cl.
*A22C 11/00* (2006.01)
*A22C 11/02* (2006.01)
*A22C 15/00* (2006.01)

(52) U.S. Cl.
CPC ........ *A22C 11/0254* (2013.01); *A22C 11/006* (2013.01); *A22C 11/008* (2013.01); *A22C 15/001* (2013.01)

(58) Field of Classification Search
CPC combination set(s) only.
See application file for complete search history.

(56) References Cited

U.S. PATENT DOCUMENTS 4,951,715 A * 8/1990 Beckman ........... A22C 11/0254 452/38
5,211,599 A * 5/1993 Stanley ............. A22C 11/0254 452/38
5,595,534 A * 1/1997 Stanley ............. A22C 11/0254 452/38
2012/0321752 A1 12/2012 Van De Nieuwelaar et al.

FOREIGN PATENT DOCUMENTS

| | | | |
|---|---|---|---|
| CN | 1468540 | A | 1/2004 |
| EP | 1371293 | A1 | 12/2003 |
| EP | 2016830 | A1 | 1/2009 |
| JP | 2007006892 | A | 1/2007 |
| JP | 2008295451 | A | 12/2008 |
| JP | 2013516171 | A | 5/2013 |
| JP | 2018074997 | A | 5/2018 |

OTHER PUBLICATIONS

Japanese Patent Office, Office Action Issued in Application No. 2021-018216, dated Mar. 8, 2022, 16 pages.
China National Intellectual Property Administration, Office Action and Search Report Issued in Application No. 202110191130.8, dated Mar. 4, 2022, 27 pages. (Submitted with Partial Translation).

* cited by examiner

*Primary Examiner* — Richard T Price, Jr.
(74) *Attorney, Agent, or Firm* — McCoy Russell LLP

(57) ABSTRACT

The present invention relates to a method, a coextrusion apparatus and a filling machine including a coextrusion apparatus of the type in question, wherein, during production of the sausage strand, the ratio of the volume flow of the casing material to the volume flow of the inner mass is variable along the sausage strand.

16 Claims, 9 Drawing Sheets

APPARATUS AND METHOD FOR PRODUCING COEXTRUDED PRODUCTS WITH A VARIABLE THICKNESS OF THE CASING MATERIAL

CROSS REFERENCE TO RELATED APPLICATION

The present application claims priority to European Patent Application No. 20158401.8 filed on Feb. 20, 2020. The entire contents of the above-listed application is hereby incorporated by reference for all purposes.

TECHNICAL FIELD

The present invention relates to a method of producing a sausage strand, a correspondingly produced sausage, and a coextrusion apparatus according to the preambles of claims 1, 10 and 12.

BACKGROUND AND SUMMARY

In the production of coextruded sausages, the casing is extruded together with the inner mass. The casing material is applied to the ejected sausage meat strand as a gel consisting e.g. of alginate and/or collagen and other components, and is then solidified e.g. by means of a salt solution, as described in EP1371293B1, by way of example.

Alternatively, the casing material may also be extruded onto a filling tube, solidified thereon and pulled off, so as to be filled with the sausage meat, as described e.g. in EP2016830. The aim is here always to apply a casing having a thickness that is as uniform as possible to the sausage meat flow. The amount of casing material fed can here be adapted to the selected thickness of the casing. The casing thickness depends on various influencing factors and should be applied as evenly as possible. Before production is started, the casing thickness is adapted once to product and process requirements. The casing thickness is usually selected such that problems, such as a rupture of the production strand during the filling process (e.g. during constriction by means of the displacer unit), will be avoided in the overall process. The sausage casing should also offer sufficient stability when the sausage chain is subsequently suspended from hooks, smoke sticks, etc. The known method is disadvantageous insofar as the thickness of the casing material is configured for the location having the highest load applied thereto. This is expensive and does not save resources. In addition, a comparatively thick casing is perceived as unpleasant by the consumer.

Taking this as a basis, it is the object of the present invention to provide a method and an apparatus, which allow a resource-saving, cost-effective and easy production of a sausage strand by means of coextrusion, while ensuring that problems arising from damage to the sausage casing will be avoided in the overall process.

This object is achieved by the features of claims 1, 10, 12 and 14.

According to the present invention, a sausage strand provided with a casing, which encompasses an inner mass, is produced by means of coextrusion. In so doing, the casing material and the inner mass are coextruded, i.e. both materials are ejected in a coextrusion unit. The coextruded casing material solidifies and encompasses then the inner mass. In the course of this process, the casing material may, as has been described hereinbefore in connection with the prior art, either be applied directly to the ejected inner mass or it may first be applied to the filling tube, where it is solidified, and subsequently to the ejected inner mass.

According to the present invention, the ratio of the volume flow of the casing material to the volume flow of the inner mass is varied along the sausage strand during production of the sausage strand. This means that, depending on different demands on the casing at various points of the sausage strand, the sausage strand thickness can be adjusted accordingly. Hence, the present invention allows a position-dependent adaptation of the amount of casing material ejected. If, for example, the ratio of the volume flow of the casing material to the volume flow of the inner mass decreases, i.e. if less casing material is ejected, the casing material thickness will become thinner, so that production can take place in a resource-saving manner. A thin casing leads to a softer bite when the product is consumed later on, and this can be perceived as more pleasant by the consumer. At points where more stress is expected, e.g. in an area where the sausage is divided or constricted by displacement units, or at points where the sausage strand will be suspended from hooks or a smoking stick, the volume flow of the casing material can then be increased in comparison with the volume flow of the inner mass, so that a greater casing material thickness will be created at these points. Hence, the present invention allows a great casing thickness to be provided at those points where it is necessary, while a thinner casing thickness will be produced at all other points in a resource-saving manner. Substantial costs can be saved in this way.

It follows that, according to the present invention, the casing material thickness can be adapted and varied, respectively, along the sausage strand depending on the stability required. In this way, a profile of the casing material thickness can be produced, which recurs periodically during production.

The volume flow of the casing material is the volume flow that exits through an extrusion opening, in particular an annular extrusion gap. The volume flow of the inner mass is the volume flow that exits a filling tube.

The casing material thickness is in particular varied by varying and controlling the volume flow of the casing material accordingly, while keeping the volume flow of the internal mass essentially constant, by way of example. This can be realized very easily while the process is taking place.

The volume flow of the casing material may e.g. be varied by controlling a pump drive for the casing material accordingly, i.e. the target value for the pump output is controlled depending on time or depending on a specific point at the sausage strand to be produced. This means that at points at which a greater casing material thickness is required, the amount of material conveyed by the pump will increase such that there will be a suitable increase in the volume flow of the casing material.

Alternatively or additionally it is, however, also possible to adjust and control the size of the opening of an extrusion die for the casing material. It is especially the width of an annular gap of the extrusion die that may here be varied in a suitable manner. The size of the opening and the pump output required for achieving a specific casing material thickness may also be determined empirically in advance.

The casing material thickness may be varied in a range of 0.05 mm-0.4 mm, in particular in a range of 0.1 mm-0.3 mm.

According to an advantageous embodiment, the sausage strand produced comprises sections of greater casing material thickness that alternate with sections of smaller casing material thickness, wherein the sections of greater casing material thickness may be smaller than the sections of smaller casing material thickness. This provides the advantage that a substantial amount of material can be saved and that the casing material thickness will actually only be increased at points subjected to higher loads. Preferably, the sausage strand sections having a thicker casing material in a range of e=10-30 mm are located at the sausage end, and the sausage strand sections having a thinner casing material are located in the central area of the sausage, e.g. in the case of a sausage caliber d of 8 mm-30 mm, in particular of 8 mm-15 mm, in a range of e≈10-20 mm, or in the case of a sausage caliber of 15 mm-25 mm, in a range of e≈15-25 mm.

According to a preferred embodiment, the sausage strand produced may be divided into individual sausages, e.g. by twisting-off, or it may be subdivided via displacement units which displace the inner mass, the division points being then advantageously located in the sections having the greater casing material thickness.

It is also possible that the sausage strand produced is suspended from a suspension unit, in particular from hooks or a smoke stick, and that the suspension areas of the sausage strand, on which the sausage strand rests e.g. on the hooks or on the smoke stick, are located in the section having the greater casing material thickness.

Another possibility is that the volume flow of the inner mass is varied. To this end, the conveying mechanism, e.g. the vane pump of a filling machine, is controlled accordingly. If, for example, the casing material is extruded onto the inner mass and the volume flow of the inner mass increases such that there will be an increase in the ejection speed of the sausage strand, the casing thickness will simultaneously decrease, and if the volume flow of the inner mass is reduced and the casing material is fed in a constant volume flow, the casing material thickness will increase.

The variable ejection of the inner mass also provides the advantage described in the following. Products with low-viscosity filling materials, which are subsequently suspended as finished products (e.g. boiled sausage products), often entail the problem that, in the case of suspended sausages, the cylindrical shape produced during the filling process will change over time, since the inner mass in the casing "slides" down, so to speak, and the product is thus no longer cylindrical but assumes the shape of a pear. According to a preferred embodiment of the present invention, the diameter of the ejected inner mass of a divided sausage may, at the time when the sausage strand is divided into individual sausages, e.g. decrease in one direction, the divided sausages being then suspended in a direction such that the diameter of the ejected inner mass decreases in a direction from top to bottom. It follows that, when the ejection of the inner mass is suitably varied, the inner mass, which is then not ejected "in a cylinder shape", can spread in the subsequent suspension process such that such spreading will then result in a substantially cylindrical sausage shape.

However, even in the case of a constant ejection of the inner mass, the ejection or the volume flow of the casing material can be adapted such that this undesirable change in the shape of the product can be prevented by applying to the ejected inner mass more casing material in the lower area of the suspended sausage and continuously less casing material towards the top.

Hence, the present invention allows production of a sausage, in the case of which the casing material thickness of the sausage is not constant. In particular, the opposed end areas of the sausage, especially the rounded sausage ends, have a greater casing material thickness than a central area between the sausage ends, the length e of an end area being preferably 10 mm to 30 mm of the length I of the sausage (in the case of a caliber in a range of 8 mm to 30 mm). The length l of the sausage extends from a tip of a rounded sausage end to the opposite tip of the rounded sausage end. The length e of the end region is here defined such that it extends from the tip of the rounded sausage end in an axial direction or longitudinal direction of the sausage.

The present invention also relates to a coextrusion apparatus, in particular for carrying out the method. The coextrusion apparatus comprises a coextrusion head for coextruding the inner mass and the casing material, the coextrusion head comprising a filling tube for ejecting the inner mass and an extrusion die associated with the filling tube and provided with an extrusion die opening, in particular an annular extrusion gap. The extrusion head may be configured such that the inner mass is extruded onto the filling tube, where it is solidified e.g. by means of a fixing solution, or such that the casing material is extruded directly onto the inner mass, where it is solidified by means of a fixing solution. The coextrusion apparatus includes a control unit which is configured such that, during production of the sausage strand, the ratio of the volume flow of the casing material to the volume flow of the inner mass is variable along the sausage strand. The control unit may be part of a control of a filling machine into which the coextrusion apparatus is integrated. The casing material thickness can thus be adapted in a position-dependent manner and, as has already been explained, also an undesired change of shape of the product can be prevented systematically by adapting the volume flows.

According to an advantageous embodiment, the coextrusion apparatus includes an input unit, which communicates with the control unit and through which a profile of the casing material thickness along the sausage strand to be produced can be entered. In this way, the casing material thicknesses can systematically be adapted to the caliber and the length of the sausage produced, or they can systematically be adapted to a respective suspension unit during production of a sausage strand.

The coextrusion apparatus may be part of a filling machine, but it may also be a separate unit that can be retrofitted into a filling machine, so that the coextrusion method according to the present invention can be carried out.

The present invention also relates to a filling machine comprising a coextrusion apparatus of the type in question. Such a filling machine comprises e.g. a hopper, a conveying mechanism for conveying the inner mass to the filling tube, and a pump for conveying the casing material to the extrusion die. Moreover, such a filling machine may also comprise a dividing unit for dividing the sausage strand into individual sausages and, possibly, a cutting unit.

According to a preferred embodiment, the volume flow or the concentration of a fixing solution, which is applied to the extruded casing material so as to solidify the ejected casing material, may be adapted to the volume flow of the casing material. In this way, it is also possible to save a substantial amount of fixing solution.

BRIEF DESCRIPTION OF THE FIGURES

The present invention will be explained in more detail hereinafter with reference to the following figures.

DETAILED DESCRIPTION

Figure 1:
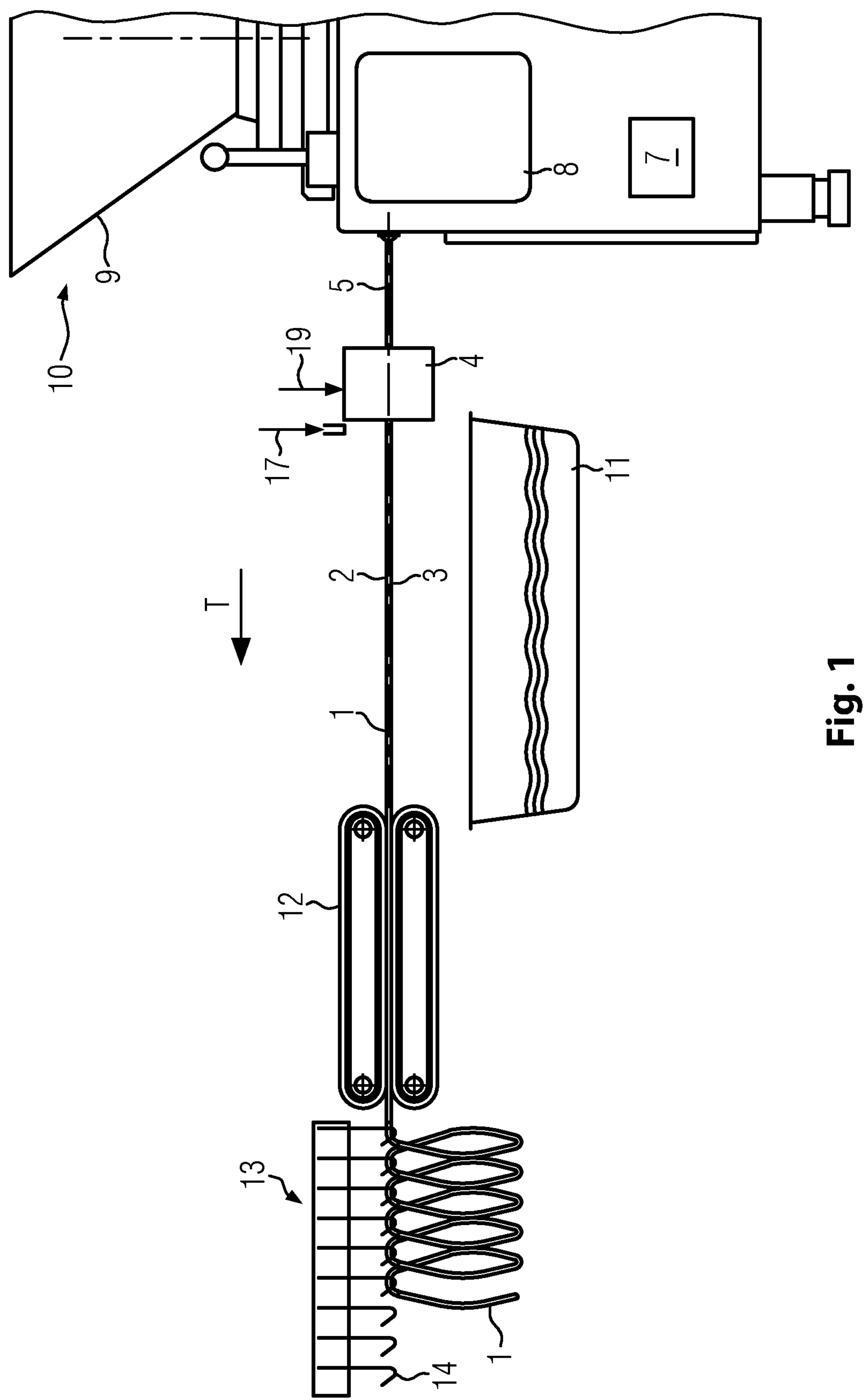
FIG. 1 shows, highly schematically, a filling machine according to a first embodiment of the present invention.
Figure 3A:
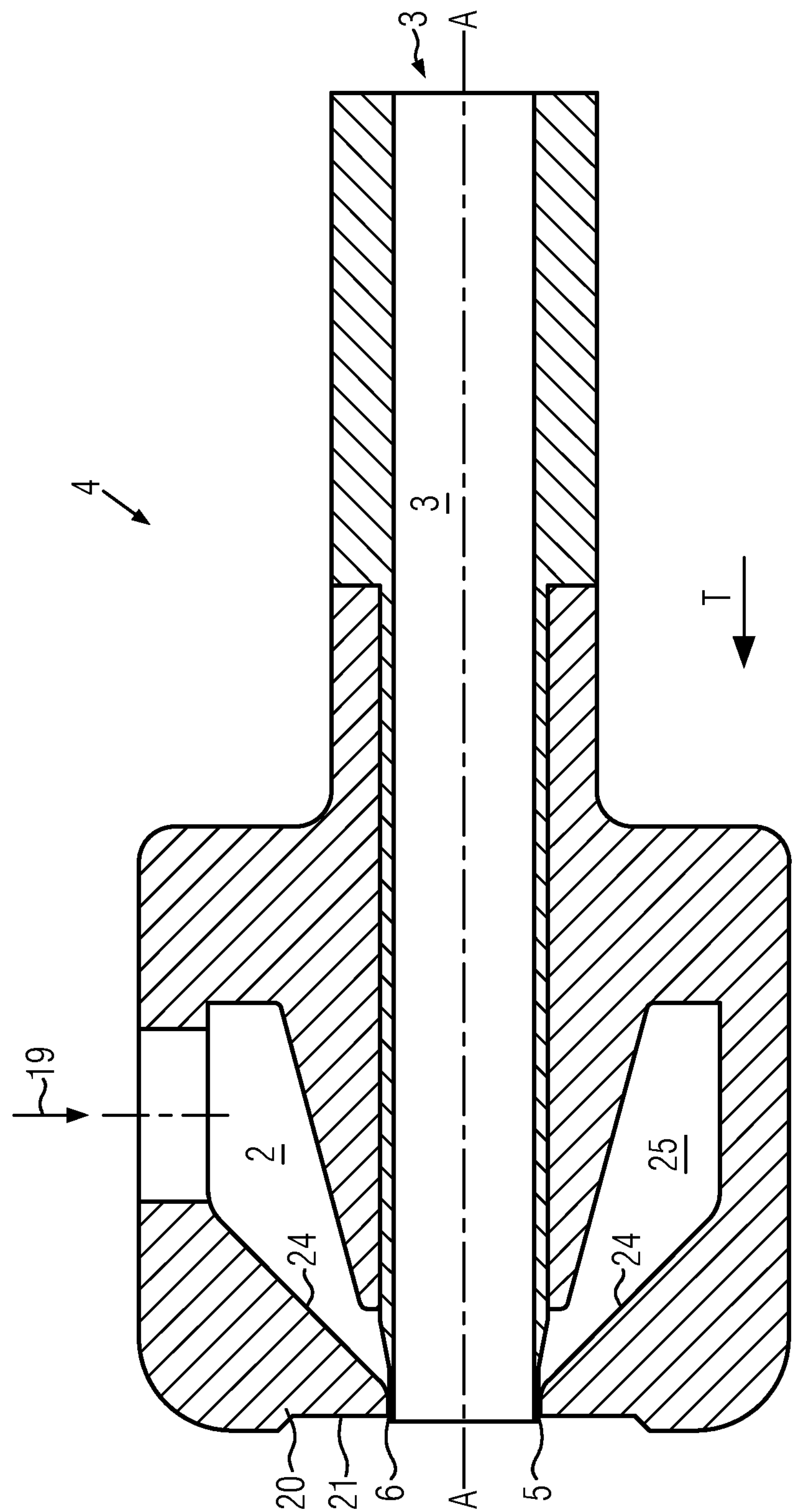
FIG. 3*a* shows, highly schematically, an embodiment of a coextrusion head according to the present invention.

FIG. 1 shows schematically an embodiment according to the present invention. FIG. 1 shows a filling machine 10 with a hopper 9, through which e.g. a pasty mass, such as sausage meat, dough etc., can be filled in and fed via a feed mechanism, which is not shown and which may e.g. be a vane pump, to a filling tube 5 (cf. e.g. FIG. 3*a*). Via the filling tube it can be extruded together with a casing material 2, so as to produce a sausage strand 1. For solidifying the casing material, a unit 17 for solidifying the casing material is additionally provided, i.e. for feeding a fixing solution for the extruded casing material 2. The fixing solution may be fed from a storage tank e.g. by means of a pump. The casing material used is e.g. alginate gel. The fixing solution used may e.g. be a calcium chloride solution. The fixing solution can then be collected in the brine container 11. Also the pump for the fixing solution is controllable via the control unit 7 such that e.g. the volume flow of the fixing solution can be adapted to the volume flow of the casing material. Alternatively or additionally, also the concentration of the fixing solution, i.e. the concentration of the fixing agents dissolved in water, in particular salts such as calcium chloride, can be adapted to the volume flow of the casing material by diluting the fixing solution, e.g. with water, to a suitable extent. Subsequently, a dosing unit for the fixing solution is controlled accordingly by the control unit 7.

The coextrusion head 4 may be followed by a conveying unit, here a conveyor belt 12, so as to convey the coextruded sausage strand 11 in a conveying direction T, in order to suspend the sausage strand then on a suspension unit 13 comprising here hooks 14, by way of example.

The coextrusion head 4 shown in FIG. 1 includes here a feed 19 for the casing material fed by a pump, which is not shown and which can be controlled by a control unit 7. Also the inner mass is fed, e.g. via a filling tube, from the not shown feed mechanism of the filling machine 1 via the filling tube 5. In the embodiment shown in FIG. 1, the sausage strand 10 is neither divided nor twisted off.

Figure 3B:
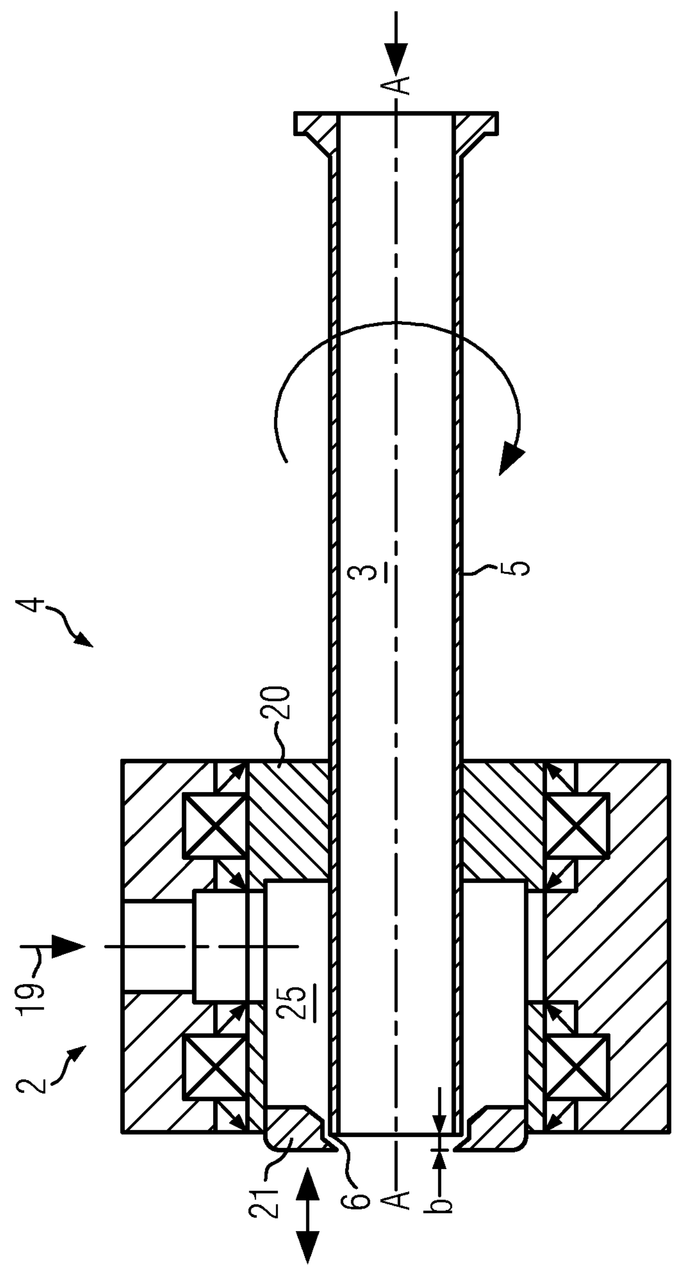
FIG. 3*b* shows, highly schematically, a further embodiment of a coextrusion head according to the present invention.

FIG. 3*b* shows a possible embodiment for a coextrusion head for coextruding the inner mass 3 and the casing material 2. The coextrusion head 4 comprises the filling tube 5 and the extrusion die 20 surrounding the filling tube 5. The filling tube 5 and the extrusion die 20 can be supported in a housing such that they are rotatable about the longitudinal axis A, so that the sausage strand can be twisted off, by way of example. The extrusion die 2 is provided with an extrusion opening 6, which is here an annular extrusion gap 6, through which the casing material 2 can be ejected. In the present embodiment, the casing material 2 is extruded directly onto the ejected inner mass 3. It is also possible to extrude the casing material 2 onto the filling tube, where it cures, as described e.g. in EP1371293B1. The annular gap 6 extends substantially radially to the longitudinal axis A of the filling pipe 5, with the wall 21 terminating essentially with the free end of filling pipe 5.

FIG. 3*b* shows an arrangement for adjusting the opening of the annular gap, in the case of which the extrusion die 20 has a wall 21 configured e.g. as an annular disk, which, on the inner circumference thereof, overlaps the free end of the filling tube 5. The annular gap 6 thus formed between the overlapping area of the wall 21 and the free end of the filling tube 5 extends, as shown in FIG. 3*b*, parallel to the longitudinal axis A of the filling tube 5. The annular disk 21 or wall 21 can be inserted into the extrusion head 4 such that it is slidable in an axial direction. By axially sliding the annular disk 21 in the direction of the double arrow, the annular gap which also extends in an axial direction, i.e. the distance between overlapping area of the annular disk 21 and the free end of the filling tube 21, can be changed. By changing the extrusion opening and the width b of the annular disk, respectively, the volume flow of the casing material can be adjusted. It follows that the movement of the wall 21 and the adjustment of the width b of the annular gap can take place during running operation, e.g. by axially shifting the annular disk 21 in the extrusion die 20 or the entire extrusion die relative to the filling tube or by axially shifting the filling tube 5.

Figure 3C:
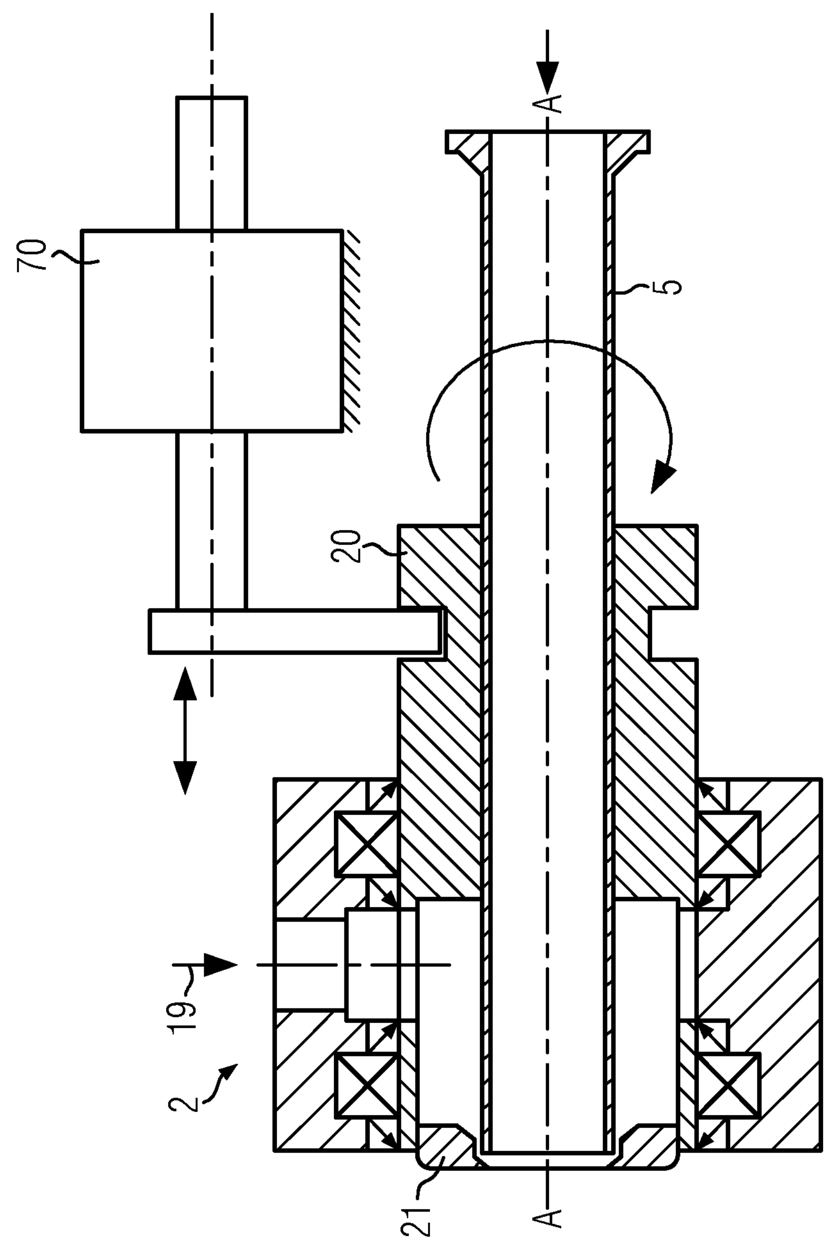
FIG. 3*c* shows, highly schematically, a further embodiment of a coextrusion head according to the present invention.

FIG. 3*c* shows, by way of example, such a mechanism in the case of which the extrusion die can be shifted and e.g. the annular disk is fixedly connected to the extrusion die.

Figure 3D:
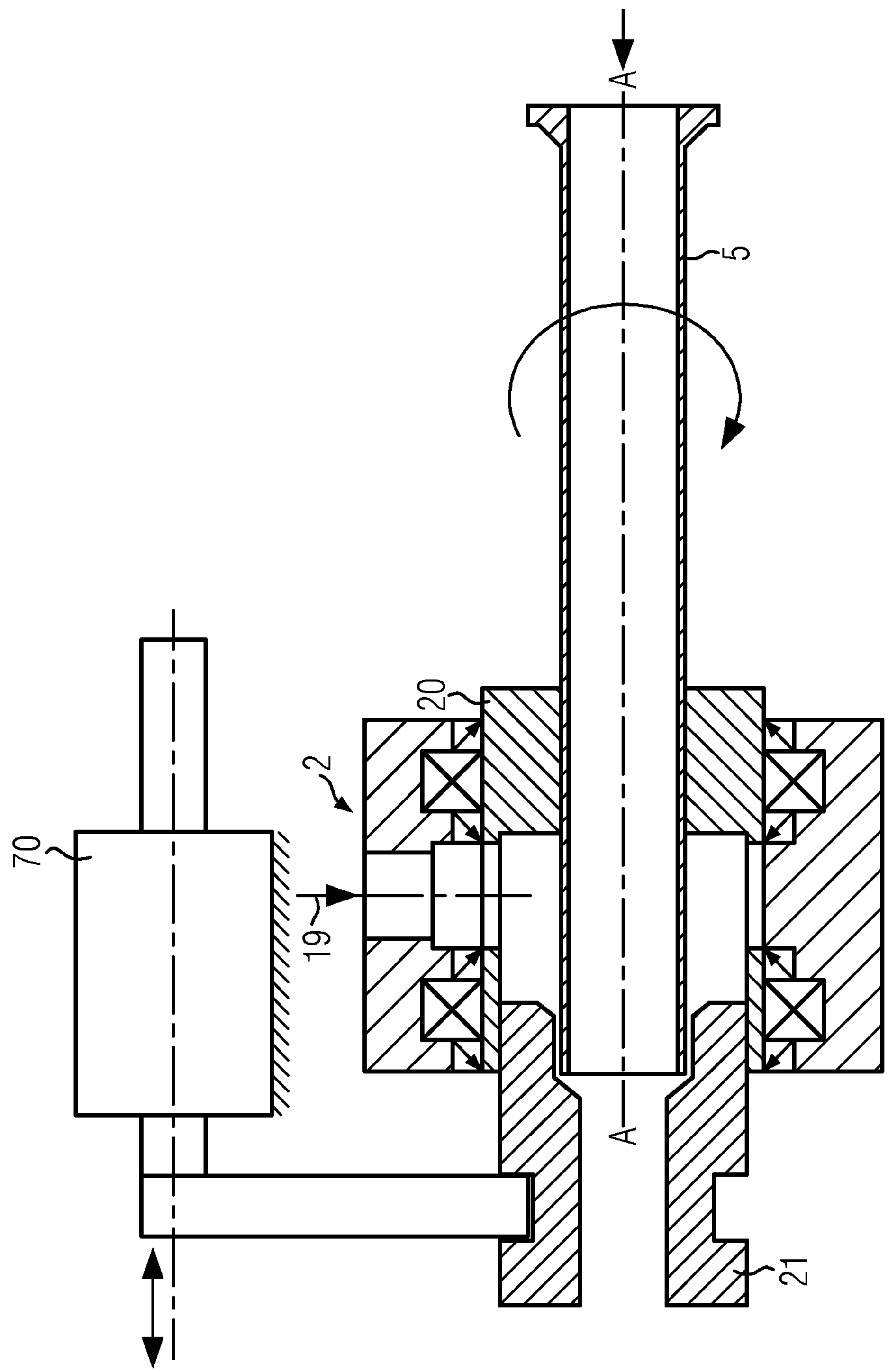
FIG. 3*d* shows, highly schematically, a further embodiment of a coextrusion head according to the present invention.

FIG. 3*d* shows a mechanism in the case of which the annular disk 21 can be shifted within the die 20.

The respective mechanism can then be controlled via the control unit 7 and vary the extrusion opening. The control unit can here control in particular an actuator 70 in the form of a linear drive, e.g. a linear servo motor 70, which is arranged on the machine frame and shifts e.g. the annular disk 21 or the entire extrusion die via the actuator/rotor.

The coextrusion apparatus is now configured such that the control unit 7, which may be integrated in the filling machine 10, may be configured such that, during production of the sausage strand 1, the ratio of the volume flow of the casing material 2 to the volume flow of the inner mass 2 can be varied along the sausage strand 1. In this way, a specific casing material thickness profile can be produced along the sausage strand 1. Via an input unit 8, a desired profile of the casing material thickness along the sausage strand can be entered. The input unit 8 may be the input unit 8 of the filling machine, by way of example. The control unit 7 may be part of the control unit of the filling machine. It follows that, according to this embodiment, the casing material thickness can be varied by controlling the volume flow of the casing material ejected via the extrusion opening 6 of the extrusion die 20.

The volume flow of the casing material can here be varied by suitably controlling the power of a pump drive, the feed 19, for the casing material, and/or by suitably adjusting the size of the opening 6 of the extrusion die 20 for the casing material, in particular the width b of the annular extrusion opening 6, as has been explained e.g. in connection with FIG. 3*b*.

The casing material may here vary within a range of 0.05 mm to 0.4 mm.

The volume flow of the casing material may here be in a range of 0.1 l/min to 6 l/min, with an extrusion opening of 0.05 mm to 0.4 mm.

Figure 2:
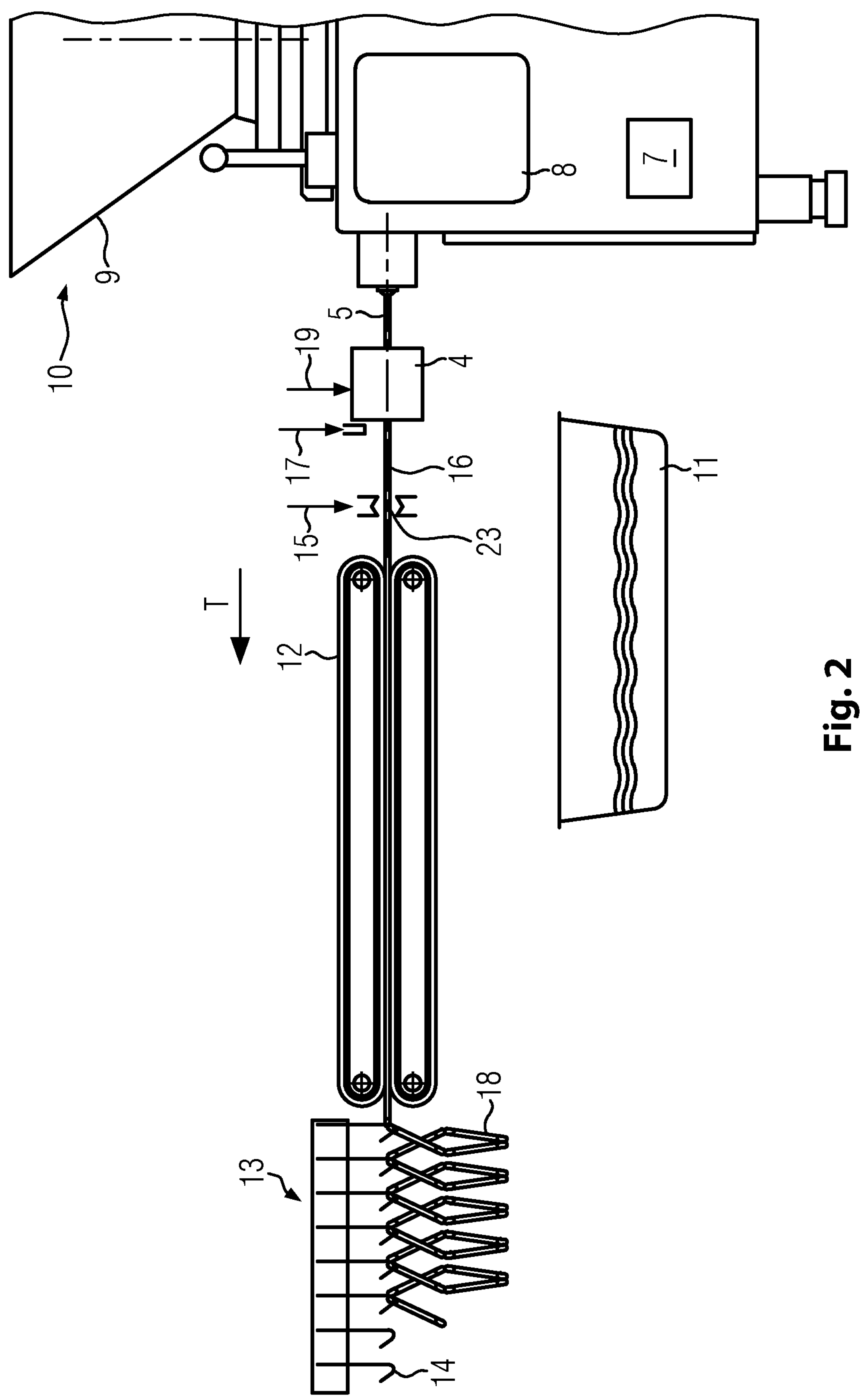
FIG. 2 shows, highly schematically, a further embodiment of a filling machine according to the present invention.

FIG. 2 shows a further embodiment corresponding to the embodiment shown in FIG. 1, the sausage strand 1 produced being here, however, divided through division elements 15 and the coextrusion head being here configured as a twist-off head for rotating the produced sausage strand about the axis A, so as to create a twist-off point 23 in the sausage strand. In this way, individual sausages 18 can be produced.

It follows that, in the case of the method according to the present invention, the casing material thickness can be varied along the sausage strand. First, a sausage strand 1 is produced by feeding an inner material 2, e.g. pasty mass, via the hopper 9 and by pushing the inner material by means of a conveying mechanism into the filling tube 5. As can be seen e.g. from FIGS. 3*a* and 3*b*, both the inner mass 3 and the casing material 2 are ejected within the coextrusion head 4. The ejected casing material solidifies by feeding a fixing solution via the feed unit 17. The sausage strand 1 produced is then conveyed in the conveying direction T via the conveying unit 12, here the conveyor belts, and suspended, by way of example. In the embodiment shown in FIG. 2, the inner mass is displaced via the division elements 15 and, making use of the twist-off unit integrated in the coextrusion head 4, the sausage strand produced is rotated about the axis A in such a way that a twist-off point 23 is created. The individual sausages 18 are further conveyed, again in the conveying direction T, e.g. via the conveying unit 12 and can then be suspended from the suspension unit 13.

Alternatively, it is also possible to divide the sausages already now into individual sausages, e.g. by means of a dividing unit (not shown).

Before the sausage strand has been produced, a desired profile for the casing material thickness had been entered via the input unit 8, or is stored in a menu in the control unit. According to an embodiment, the casing material thickness along the sausage strand may be varied e.g. by suitably controlling the volume flow of the casing material. The volume flow of the casing material 2 can be varied by suitably controlling the pump drive for the casing material (not shown). Alternatively or additionally, also the size of the opening 6 of the extrusion die 20 can be adjusted and controlled, respectively, during running production, so as to adjust the volume flow in a suitable manner. The size of the opening of the extrusion die 20 and the respective pump output for generating a specific volume flow in order to achieve a desired casing material thickness may be determined e.g. empirically. Hence, the present invention allows to produce sections having a greater casing material thickness and sections having a smaller casing material thickness, which alternate. The sections having the greater casing material thickness may be smaller than the sections having the smaller casing material thickness. A thicker casing material thickness gives the product more stability. This is necessary at points where the product is subjected to higher loads. These are, for example, areas where the sausage strand is twisted off (cf. FIG. 2) or suspended from hooks or from a smoke stick (cf. FIG. 1).

In the case of a varying casing material thickness, the amount of fixing solution used for solidification is adapted, in order to provide a sufficient amount of fixing solution, especially calcium ions.

Figure 4:
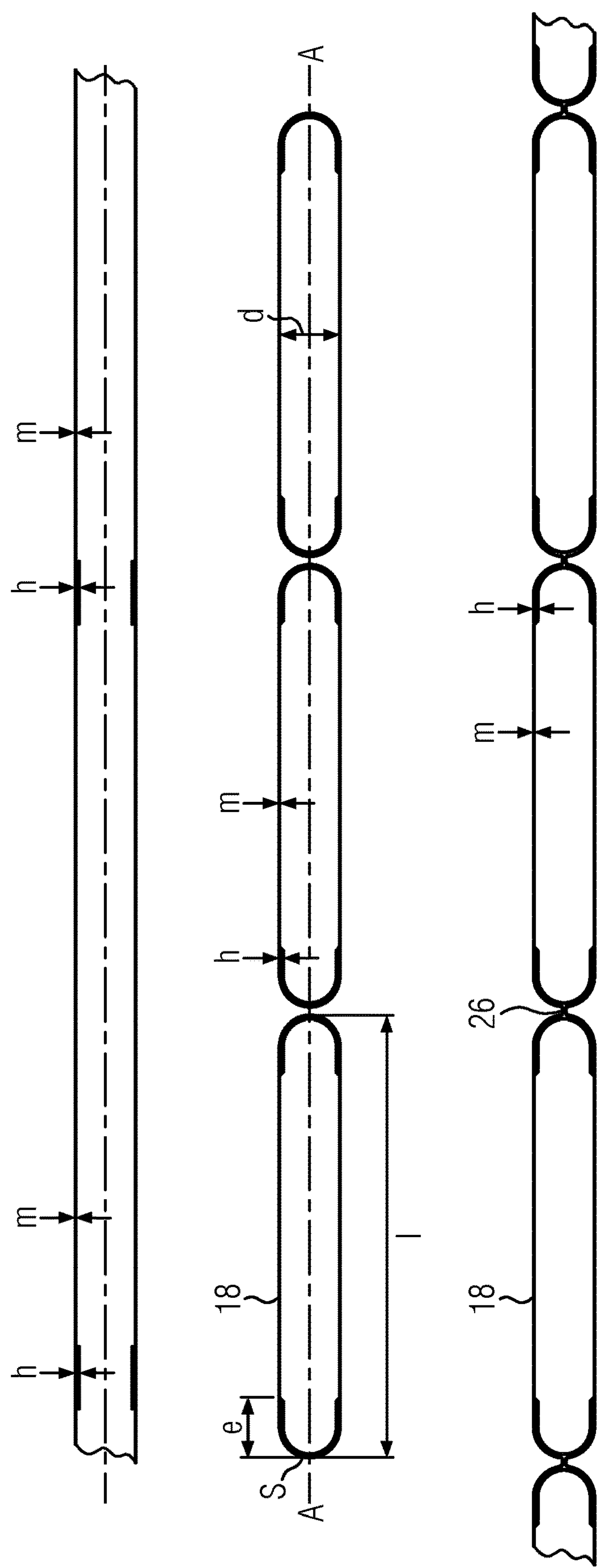
FIG. 4 shows, highly schematically, a sausage strand and divided sausages with different casing thicknesses according to the present invention.

FIG. 4 shows e.g. sausages 18 according to the present invention.

The opposed end areas of the sausage 18, in particular the rounded sausage ends, have a greater casing material thickness than a central area between the sausage ends, the length e of an end area being preferably e.g. 10 mm to 30 mm, in particular in the case of a sausage caliber d of 8 mm to 30 mm. In particular, in the case of a sausage caliber of 8 mm-15 mm, the length e is in a range of e≈10-20 mm, or in the case of a sausage caliber of 15 mm-25 mm, in a range of e≈15-25 mm, the length l of the sausage extending from the tip S of the rounded sausage end to the opposite tip S of the opposite rounded sausage end, and the length of the end region e extending from the tip S of the rounded sausage end in an axial direction A or longitudinal direction of the sausage.

In the upper area of FIG. 4, individual sausages 18 that have already been divided are shown, while the lower sausages 18 shown in FIG. 4 are still connected in the form of a sausage chain and are linked via a sausage neck 26.

As can be seen from FIG. 4, the end areas are strengthened and have e.g. a casing material thickness h in a range of $0.2\ mm < h <= 0.4\ mm$, while the central areas m between the strengthened end areas are thinner and only have a thickness in a range of $0.05\ mm < m <= 0.2\ mm$. In this way, a substantial amount of casing material can be saved. At the same time, the product can have a thinner casing material thickness between the end areas, and this will result in a softer bite when the product is consumed later on, a circumstance that can be perceived as more pleasant by the consumer.

Also in the case of the embodiment shown in connection with FIG. 1, the non-divided sausage strand as shown in FIG. 4 has an increased casing material thickness h at the suspension points, the dimensions h and m being again within the above-mentioned ranges.

However, adapting the volume flow of the casing material, while e.g. the volume flow of the inner mass remains constant, is not the only possibility of adapting the casing material thickness. This can also be done, if the volume flow of the inner mass is varied, since with an increasing volume flow of the inner mass and an e.g. constant volume flow of the casing material, the casing material thickness will decrease, when the casing material is extruded onto the inner mass.

Figure 5:
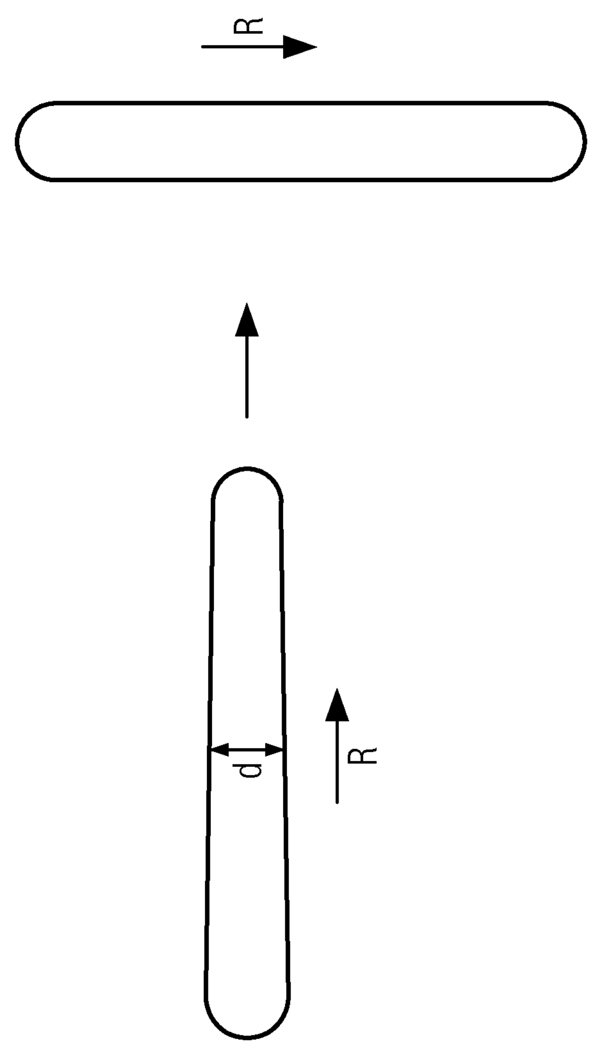
FIG. 5 shows, highly schematically, sausages according to the present invention.
Figure 6:
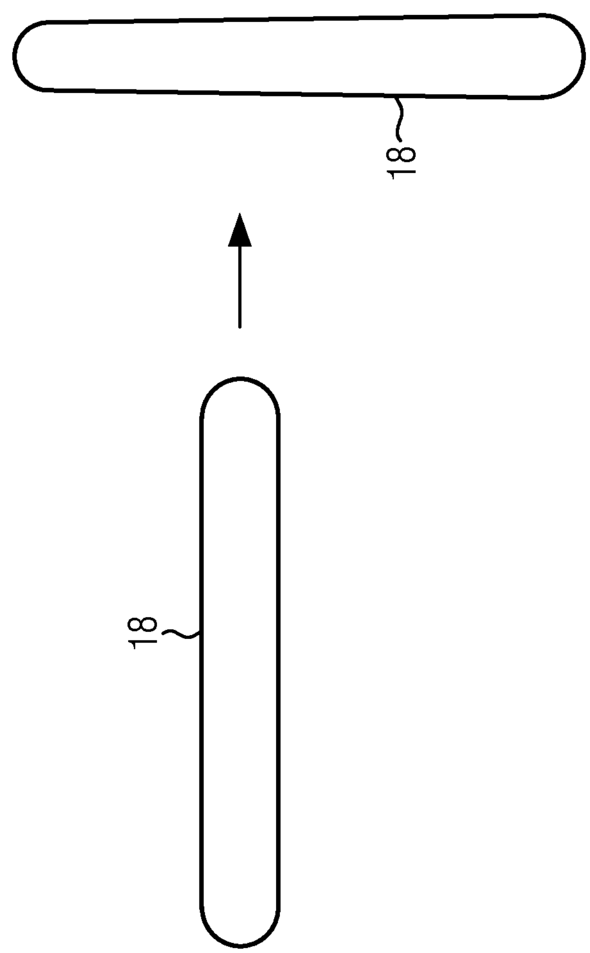
FIG. 6 shows, highly schematically, sausages according to the prior art.

As can be seen in FIG. 6, it may happen in the prior art that, when low-viscosity filling materials, i.e. low-viscosity inner masses 3, are used, which are subsequently suspended as finished products (e.g. boiled sausage products), the problem arises that, depending on the volume (diameter/length) and the weight, the problem may arise that the suspended, filled cylindrical shape may change over time in such a way that part of the inner mass in the casing slides down and the products may thus no longer be cylindrical but may assume the shape of a pear, as can be seen in FIG. 6. As shown in FIG. 5, the diameter d of the ejected inner mass of a separated sausage 18 can decrease in a direction R by reducing the volume flow accordingly. The divided sausages are then suspended in a direction R in such a way that the diameter of the ejected inner mass decreases in a direction from top to bottom. It follows that, when the ejection of the inner mass is here suitably varied, i.e. the volume flow is suitably varied, the inner mass 3, which will then be ejected in a non-cylindrical shape, can spread in the subsequent suspension process in such a way that such spreading will approximately result in the typical cylindrical sausage shape, as shown in FIG. 5. The undesired change in shape caused by the suspension process will be compensated for by the variable volume flow, so to speak. Since this depends on a plurality of parameters, such as temperature, viscosity of the inner mass, portion length and diameter, etc., the ejection profile, i.e. the volume flow profile, will then usually be adapted to the respective product and can be set and stored making use of the input unit 8, by way of example.

However, even in the case of a constant ejection of the filling material, i.e. a constant volume flow of the inner mass, the ejection of the casing material 2 can be adapted such that these undesirable changes in the shape of the product can be prevented by applying to the ejected inner mass more casing material in the lower area of the suspended sausage and continuously less casing material towards the top.

According to the present invention, the thickness of the casing material can thus be adapted in a position-dependent manner through the variable ejection or volume flow of the inner mass and/or of the casing material.

The invention claimed is:

1. A method of producing a sausage strand comprising an inner mass encompassed by a casing, wherein both the casing material and the inner mass are coextruded and the extruded casing material solidifies, wherein during production of the sausage strand, a ratio of a volume flow of the casing material to the volume flow of the inner mass is varied along the sausage strand.

2. The method according to claim 1, wherein a casing material thickness along the sausage strand varies and a produced profile of the casing material thickness recurs periodically.

3. The method according to claim 2, wherein the casing material thickness is varied by suitably varying the volume flow of the casing material.

4. The method according to claim 3, wherein the volume flow of the casing material is varied by controlling a pump drive for the casing material accordingly and/or by adjusting the size of an opening of an extrusion die for the casing material, including a width (b) of an annular gap of the extrusion die, in a suitable manner.

5. The method according to claim 2, wherein the casing material thickness varies in a range of 0.05 mm-0.4 mm.

6. The method according to claim 5, wherein the volume flow of the inner mass is varied.

7. A sausage, which has been produced with the aid of a method according to claim 6, wherein the casing material thickness of the sausage is not constant.

8. The sausage according to claim 7, wherein opposed end areas of the sausage, including rounded sausage ends, have a greater casing material thickness than a central area between the sausage ends.

9. The method of claim 8, wherein a length (e) of the end area is 10 mm to 30 mm in the case of the sausage caliber being in the range of 8 mm to 30 mm.

10. The method according to claim 5, wherein the sausage strand is divided into individual sausages, by twisting off, and a diameter of the inner mass of a sausage to be divided decreases in one direction, and the divided sausages are suspended in a direction such that the diameter of the inner mass decreases in a direction from top to bottom.

11. A coextrusion apparatus for carrying out the method according to claim 2, comprising a coextrusion head for coextruding the inner mass and the casing material, wherein the coextrusion head comprises a filling tube for ejecting the inner mass and an extrusion die associated with the filling tube and provided with an extrusion die opening, including an annular extrusion gap, for ejecting the casing material, wherein the coextrusion apparatus includes a control unit which is configured such that during production of the sausage strand, the ratio of the volume flow of the casing material to the volume flow of the inner mass is variable along the sausage strand.

12. The coextrusion apparatus according to claim 11, wherein the coextrusion apparatus includes an input unit, which communicates with the control unit and through which a profile of the casing material thickness along the sausage strand to be produced can be entered.

13. A filling machine comprising the coextrusion apparatus according to claim 11, and further comprising a hopper, a conveying mechanism for conveying the inner mass to the filling tube, and a pump for conveying the casing material to the extrusion die.

14. The method according to claim 1, wherein in the sausage strand produced, sections of greater casing material thickness alternate with sections of smaller casing material thickness, wherein the sections of greater casing material thickness may be shorter than the sections of smaller casing material thickness and wherein, in the case of divided sausages, the sausage strand sections having a thicker casing material are located in an area at a sausage end and the sections having a thinner casing material are located in a central area of the sausage.

15. The method according to claim 14, wherein the sausage strand produced is divided into individual sausages, by twisting-off, and that a division point is located in the section having the greater casing material thickness, or that the sausage strand produced is suspended from a suspension unit, from hooks or a smoke stick, and that suspension areas of the sausage strand, on which the sausage strand rests on the respective hooks, are located in the section having the greater casing material thickness.

16. The method according to claim 1, wherein the volume flow or a concentration of a fixing solution, which is applied to the extruded casing material so as to solidify the ejected casing material, is adapted to the volume flow of the casing material.

* * * * *